Patented Nov. 21, 1950

2,530,792

UNITED STATES PATENT OFFICE 2,530,792

TEXTILE MATERIALS MADE MILDEW RESISTANT WITH DI-(4-HYDROXYCHLOROPHENYL) DIMETHYL METHANE

William Dorsey Stewart and John Herman Standen, Yonkers, N. Y., assignors to The B. F. Goodrich Company, New York, N. Y., a corporation of New York No Drawing. Application May 4, 1946, Serial No. 667,475

3 Claims. (Cl. 117—138.5)

This invention relates to the treatment of textile and fabric and pertains more specifically to compositions which are effective mildewcides or fungicides for textile and fabric treatment. The term "mildewcide" as employed herein is used to define substances which will prevent the destruction of such materials as cotton, leather, wood, wool, fur, and articles fabricated from these materials from what is commonly referred to as "mildew." The common or popular usage of the term "mildew" is broader in meaning than the botanical meaning for it includes not only the fungi which are known botanically as mildew, but also includes bacteria and other microorganisms which cause the destruction of cotton, leather, etc.

This invention has for its general object the provision of new and useful compositions having the power of killing or repelling economically harmful pests such as bacteria and fungi and other microorganisms which prey on plant and animal matter in its inanimate or fabricated state. Other objects will appear hereinafter.

These objects are accomplished by the following invention of a mildewcidal composition comprising as an essential active ingredient a halogenated poly-nuclear phenol having the halogen atoms and the hydroxy groups attached directly to the nuclear aromatic rings. These compounds are obtained by the direct halogenation of the aromatic nuclei of compounds having the general formula:

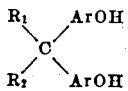

where $R_1$ and $R_2$ are univalent aliphatic hydrocarbon radicals and Ar is an aromatic hydrocarbon radical. For example, chlorine derivatives may be made by passing chlorine into a solution of the corresponding poly-nuclear monohydric aromatic compound in a suitable solvent, e. g., glacial acetic acid or other lower fatty acid, or into a suspension of the compound in an inert non-solvent for instance, a liquid chlorinated hydrocarbon such as ethylene dichloride, at a temperature of from 0° to 50° C. until the desired increase in weight is obtained. The desired halogen-containing compound may be crystallized out from the reaction mixture or precipitated by the addition of water and recrystallized from a suitable solvent, e. g., dilute acetic acid.

Suitable halogen substitution products are the di- and tetra-halo derivatives of di(4-hydroxyphenyl) dimethyl-methane such as di(3-chlor, 4-hydroxyphenyl) dimethyl-methane, di(4-hydroxy,3,5-dichlorphenyl) dimethyl-methane and di(4 - hydroxy,3,5 - dibromophenyl) dimethylmethane, as well as halo derivatives of di(4-hydroxyphenyl) methyl-methane, di(4-hydroxyphenyl) ethyl-methane, di(4-hydroxyphenyl) methyl-ethyl - methane, di(4 - hydroxyphenyl) propyl-methane, di(4-hydroxyphenyl) dipropyl-methane, 1,1-di(4-hydroxyphenyl) cyclohexane, di(4-hydroxyphenyl) phenyl-methane, di(alpha-hydroxy-naphthyl) dimethyl-methane, and di-(beta - hydroxynaphthyl) dimethyl - methane. Further examples of halogen substitution products of these compounds are di(4-hydroxyphenyl, 3,5-dichlorphenyl) methyl-methane, di(4 - hydroxy-3-chlorophenyl) methyl-methane, di(4-hydroxy,3,5-dichlorphenyl) ethyl-methane, di(4-hydroxy,3,5-dichlorphenyl) methyl-ethyl-methane and di(4-hydroxy,3,5-dichlorphenyl) propyl-methane, and the corresponding bromine compounds.

It is to be noted that the compounds which are useful according to our invention, of which the above are examples, do not contain halogenated side chains. Compounds with halogenated side chains may, however, be formed especially if halogenation be effected at relatively high temperatures. Such compounds usually have lacrymatory properties and, therefore, would not be as suitable for treating fabrics. To limit halogenation as far as possible to the aromatic nuclear rings, it is advantageous to carry out the halogenation process at relatively low temperatures, the range of about 10° to 20° C. and up to about 30° being satisfactory. A more specific description of the preparation of these halogenated compounds can be found in the literature and patents.

We have found that these halogenated polynuclear monohydric aromatic compounds are highly efficient mildewcides, being effective when applied to cotton fabric and cord in concentrations as low as 0.5% by weight on the fabric.

These halogenated compounds were dissolved in a mixed organic solvent containing 80 parts by volume of high test gasoline and 20 parts by volume of isopropanol. The initial concentration of the solution to be employed to apply the mildewcide to the fabric was adjusted to place approximately 1% of the halogenated compound on the fabric by weight, the lower concentrations then being obtained by dilution of the solution with fresh solvent. Weighed samples of the fabric were dipped in the treating solution, then passed between spring-pressed rolls of a wringer to remove the excess solution and then dried. The dried, treated samples were reweighed to determine the amount taken up by the fabric. The treated fabric samples were then subjected to a soil burial test which is one of the accelerated tests for determining the ability of materials to protect fabrics from disintegrating or rotting from the action of molds, bacteria and other micro-organisms.

The following examples show how a specific halogenated polynuclear phenol, di(4-hydroxy 3-chlorophenyl) dimethyl-methane, compares as a mildewcide with some of the commonly used mildewcides for cotton fabric.

A heavy cotton cord, similar to that used in fishnets, was treated with the materials shown in Table I so that there was 1% by weight of the mildewcide on the cord. Such commonly used fabric mildewcides as 2,2'-dihydroxy 5,5'-dichlordiphenyl-methane and copper naphthenate were employed as a basis for estimating the efficiency of our mildewcides. The treated cord buried in heavily infested soil for 15 days after which time tensile strengths were run. The "breaking strength" reported is in pounds. The original cord before treatment and burial had a breaking strength of 53 pounds.

TABLE I

*Cotton cord strength after 15 days burial*

| Mildewcide | Breaking Strength, Pounds |
| --- | --- |
| None | (¹) |
| Copper naphthenate | 38.5 |
| 2,2'-dihydroxy 5,5'-dichlor diphenyl-methane | 53.5 |
| Di(4-hydroxy 3-chlorophenyl) dimethyl-methane | 53.0 |

¹ Disintegrated.

From the data in Table I, it is quite apparent that di(4-hydroxy 3-chlorophenyl) dimethyl-methane is equally as efficient a mildewcide as 2,2'-dihydroxy 5,5'-dichlordiphenyl-methane and is superior to copper naphthenate, both of which are commonly used mildewcides for fabric.

A cotton tape fabric was treated in such a manner so that the fabric take up of the mildewcide varied. The results of a 14-day soil burial test of treated cotton tape fabric samples are given in Table II for fabric take up of 1%, 0.5% and 0.25% all by weight on the fabric. The "Grab Tensile Strength" is reported in pounds per square inch (p. s. i.).

TABLE II

*Cotton tape strength after 14 days burial*

| Mildewcide—Take up | Grab Tensile Strength, p. s. i. |
| --- | --- |
| None | (¹) |
| 2,2'-dihydroxy 5,5'-dichlordiphenyl-methane: | |
| 1% | 183 |
| 0.5% | 20 |
| 0.25% | 21 |
| Di(4-hydroxy-3-chlorophenyl) dimethyl-methane: | |
| 1% | 163 |
| 0.5% | 92 |
| 0.1% | 16 |
| Di(4-hydroxy-3,5-dichlorophenyl) dimethyl-methane: | |
| 1% | 112 |
| 0.5% | 78 |
| 0.1% | 28 |

¹ Completely disintegrated.

The dichlor substituted compound of class of compounds with which our invention is concerned is not as effective in the 14 day test as 2,2' - dihydroxy 5,5' - dichlordiphenyl - methane when used in 1% by weight on the fabric, but in the lower percentage take up both the dichlor and the tetrachlor substituted compounds are far more efficient. One of the tape samples treated with di(4-hydroxy 3-chlorophenyl) dimethyl-methane had a grab tensile strength of 146 p. s. i. after 20 days burial in the infested soil.

Two cotton fabric samples with a 1% take up of di(4-hydroxy 3-chlorophenyl) dimethyl-methane on the first sample and a 1% take up of di(4-hydroxy-3,5-dichlorophenyl) dimethyl-methane on the second sample were autoclaved in open steam for 10 minutes at 20 pounds pressure. After this treatment, the first sample had a grab tensile strength of 172 pounds per square inch, and the second sample had a grab tensile strength of 159 pounds per square inch. The two treated samples were buried in infested soil for 13 days after which the first sample had a grab tensile strength of 160 pounds per square inch while the second had a grab tensile strength of 74 pounds per square inch. Two other similarly treated samples were weathered on the roof for six months but were not autoclaved. When these latter two samples were given soil burial test for 14 days, they were found to be in excellent condition.

These nuclear halogenated compounds with which our invention is concerned have been tested for irritation due to contact of treated fabrics with the skin. In general, they have been found to cause no irritation.

In general, these halogenated poly-nuclear monohydric aromatic compounds are light in color which would make them exceedingly useful for treating light colored fabrics, are free from odor which would make them useful for fabrics which would be used indoors, and are nearly insoluble in water which would make them desirable where the treated fabric is frequently subjected to heavy rainfall or any other similarly severe moist condition which would tend to leach out a soluble mildewcide.

The above description and examples are only intended to illustrate and are not to be construed as limiting our invention. Any modification of a variation therefrom which conforms to the spirit of our invention is intended to be included within the scope of the appended claims.

We claim:

1. Cotton cord or fabric rendered resistant to mildew by reason of deposit thereon of a single agent consisting of 0.25 to 1.0% based on the weight of cotton of di-(4-hydroxy-3-chlorophenyl) dimethyl methane.

2. Cotton cord or fabric rendered resistant to mildew by reason of deposit thereon of a single agent consisting of 0.25 to 1.0% based on the weight of cotton of di-(4-hydroxy-3,5-dichlorophenyl) dimethyl methane.

3. A textile material normally subject to destruction or deterioration by mildew rendered resistant to mildew by reason of deposit thereon of a single agent consisting of 0.25 to 1.0% based on the weight of the material of a di-(4-hydroxychlorophenyl) dimethyl methane.

WILLIAM DORSEY STEWART.
JOHN HERMAN STANDEN.

REFERENCES CITED

The following references are of record in the file of this patent:

UNITED STATES PATENTS

| Number | Name | Date |
| --- | --- | --- |
| 1,707,181 | Weiler, et al. | May 26, 1929 |
| 1,971,436 | Weiler | Aug. 28, 1934 |
| 2,036,916 | Bruson | Apr. 7, 1936 |
| 2,250,480 | Gump | July 29, 1941 |
| 2,254,904 | Moss | Sept. 2, 1941 |
| 2,359,242 | Perkins, et al. | Sept. 26, 1944 |